_United States Patent Office_

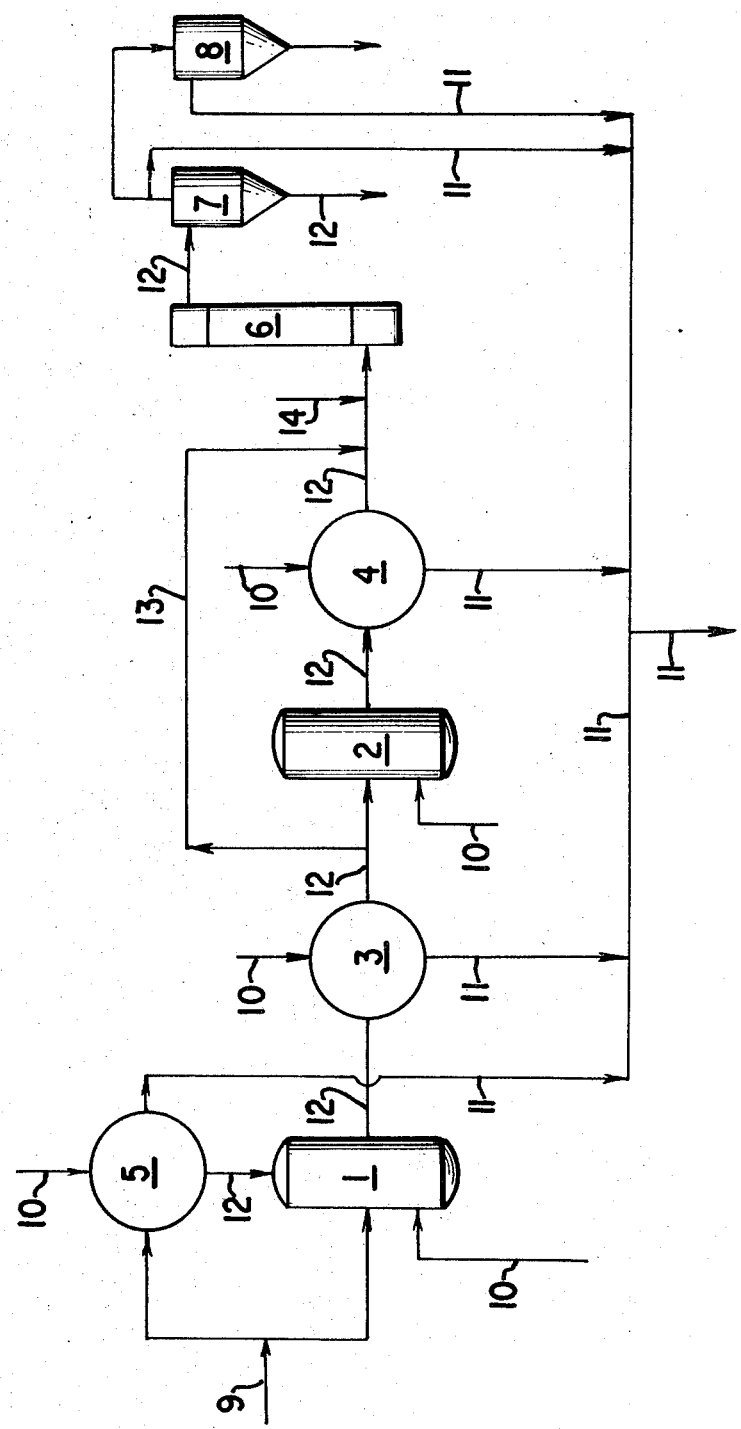

3,775,389
Patented Nov. 27, 1973

3,775,389
PROCESS FOR THE PURIFICATION OF POLYOLEFINS
Anton Hundmeyer, Burghausen, Fritz Lochner, Cologne, and Gottfried Piekarski, Burghausen, Germany, assignors to Wacker-Chemie GmbH, Munich, Germany
Filed June 14, 1971, Ser. No. 152,761
Claims priority, application Germany, June 15, 1970, P 20 29 539.0
Int. Cl. C08f 1/44, 1/88
U.S. Cl. 260—88.2 R                    10 Claims

ABSTRACT OF THE DISCLOSURE

A process for the purification of polyolefins polymerized in the presence of a catalyst system of silicon compounds with siliconhydrogen compounds, metal compounds of subgroups IV to VI of the Periodic Table and, optionally, of the main group III of the Periodic Table, and in the presence of inert organic solvents which consists in the steps of (1) utilizing, as said inert organic solvent and as the purification solvent, a solution of saturated hydrocarbons having 6 to 9 carbon atoms and a constant boiling point, (2) decomposing a polyolefin suspension in said solvent containing said catalyst system by the action of said solvent containing from 1% to 40% by volume of an alkanol having 2 to 3 carbon atoms and mixtures thereof, under a dry gas atmosphere at a temperature of from 50° C. to 100° C., (3) separating moist polyolefin from said solvent, (4) washing said moist polyolefin with said solvent containing from 0 to 40% by volume of an alkanol having 2 to 3 carbon atoms and mixtures thereof at a temperature of from 50° C. to 100° C., (5) continuously drying said washed moist polyolefin, and (6) recovering purified polyolefins substantially free of ash and low molecular weight polymers. Optionally, (1) the polyolefin suspension from the polymerization may be separated from the inert solvent and washed with the solvent mixture before the decomposing step, (2) the washed moist polyolefin may be pulped with the solvent alcohol mixture, the suspension separated and the moist polyolefin again washed with the solvent alcohol mixture, (3) the decomposing step may be conducted in the presence of small amounts of air or oxygen and (4) the continuous drying step may be conducted in the presence of small amounts of steam.

THE PRIOR ART

The preparation of low-pressure polyolefins, such as polyethylene, polyethylene modified with α-olefins, polypropylene, polybutylene, and poly-4-methylpentene, is often carried out from the corresponding monomers in the presence of inert solvents and catalysts. These catalysts are obtained, for instance, according to German Patent No. 1,191,105, German published application DAS 1,214,407 and German published application DOS 1,545,-177 by the reaction of silicon compounds with siliconhydrogen compounds, metal compounds of the IV to VI sub-groups of the Periodic Table and, optionally, halides or alcoholates of metals of the main group III of the Periodic Table. The polymerizate is obtained thereby as a suspension in the inert solvent which can be, for example, a mixture of hydrocarbons.

The polymer suspension contains, among other impurities, also unused catalyst and starting materials for the catalyst preparation and other compounds that are formed in the preparation of the catalyst. Besides the desired high-molecular-weight polyolefins, also undesirable oil and waxy, that is low-molecular-weight polymers or also so-called atactic polymers are present.

The separation of these disturbing impurities is particularly made difficult in that, by the use of catalysts derived from silicon compounds, such as hydrogen-polysiloxane, cleavage and crosslinked products of largely unknown structure are produced in the polymerization, and these products are present in the working-up of the polymerizates. Furthermore, the removal of the low-molecular-weight or atactic polymer constituents, which show characteristic solution properties, depending upon the molecular weight and built-in siloxy groups, is difficult. Last but not least, the purification of the polyolefin has to be carried out so, that as few as possible and non-corrosive auxiliary agents are required. In addition, these auxiliary agents should be easily recoverable and again usable. Besides, in a continuous polymerization also the working-up processing should be made continuously.

The processes known until now for the purification of polyolefins, prepared with silicon catalysts, are principally discontinuously, and are unsatisfactory both to their effect and, particularly, in regard to the expense of the processing.

In the prior art purification of polyolefins, for instance, the use of aliphatic alcohols, such as methanol, isopropanol or n-butanol in combinations with aqueous or alcoholic acids, such as nitric acid, hydrochloric acid or sulfuric acid has been known (DBP 1,191,105, DAS 1,123,-473 and 1,201,062, U.S. Pat. 2,974,133, Belgian Pat. 660,696), where before or after the acidic treatment partly also aqueous or alcoholic alkalies are used. Also the use of aliphatic alcohols in combination with ketones, such as acetone or methylethylketone has been described (DOS 1,442,722 and 1,545,177, British Pat. 934,119). The prior art further describes the treatment of the obtained polymer product for the decomposition of silicon-containing catalyst only with anhydrous aliphatic alcohol and, optionally, to wash it subsequently with water (British Pats. 975,969 or 962,952).

In many cases, the purification procedures are combined with a treatment of the polymerizate with warm water or steam. Often as inert diluents high boiling (boiling point range 200° C. to 235° C.) or low boiling (90° C. to 140° C. or 115° C. to 135° C.) hydrocarbon mixtures are used, whereby the purification of the polymerizate and of the solvents or their recovery is made difficult.

By the above-mentioned procedures for the purification of polyolefins, colorless polymerizates with relatively low total ash content are indeed obtained. However, the halogen content, also the part of the elements of the sub-groups IV to VI and of main group III of the Periodic Table or their compounds in the total ash as well as the content of waxy low-molecular-weight polymers in the high polymers are undesirably high. This high halogen content in polymers (100 to 200 p.p.m.) may lead to corrosion of the metallic parts of the processing equipment and also to changes in the polymerizates. A too high degree of compounds of the elements of the sub-groups IV to VI, particularly titanium, vanadium and of the elements of the main group III of the Periodic Table, particularly aluminum, also strongly impairs the stability and the electrical properties of the polymer. Equally undesirable is a too high portion of waxes in the polyolefins, since they quickly become brittle and full of cracks on exposure to air after thermoplastic shaping.

OBJECTS OF THE INVENTION

An object of the invention is to develop an inexpensive process for the purification of polyolefins to obtain purified polyolefins substantially free of ash and low-molecular-weight polymers.

Another object of the invention is the development of a process for the purification of polyolefins polymerized in the presence of a catalyst system of silicon compounds with siliconhydrogen compounds, metal compounds of subgroups IV to VI of the Periodic Table and, optionally, of the main group III of the Periodic Table, and in the presence of inert organic solvents which consists in the steps of (1) utilizing, as said inert organic solvent and as the purification solvent, a solution of saturated hydrocarbons having 6 to 9 carbon atoms and a constant boiling point, (2) decomposing a polyolefin suspension in said solvent containing said catalyst system by the action of said solvent containing from 1% to 40% by volume of an alkanol having 2 to 3 carbon atoms and mixtures thereof, under a dry gas atmosphere at a temperature of from 50° C. to 100° C., (3) separating moist polyolefin from said solvent, (4) washing said moist polyolefin with said solvent containing from 0 to 40% by volume of an alkanol having 2 to 3 carbon atoms and mixtures thereof at a temperature of from 50° C. to 100° C., (5) continuously drying said washed moist polyolefin, and (6) recovering purified polyolefins substantially free of ash and low-molecular-weight polymers.

A further object of the invention is the development of improvements on the above basic purification process in that optionally, (1) the polyolefin suspension from the polymerization may be separated from the inert solvent and washed with the solvent mixture before the decomposing step, (2) the washed moist polyolefin may be pulped with the solvent alcohol mixture, the suspension separated and the moist polyolefin again washed with the solvent alcohol mixture, (3) the decomposing step may be conducted in the presence of small amounts of air or oxygen and (4) the continuous drying step may be conducted in the presence of small amounts of steam.

These and other objects of the invention will become more apparent as the description thereof proceeds.

THE DRAWINGS

The figure shows a flow diagram of the process of the invention.

DESCRIPTION OF THE INVENTION

Now a process for the purification of polyolefins has been found. These polyolefins are prepared in the presence of catalysts from silicon compounds with silicon-hydrogen compounds, metal compounds of the subgroups IV to VI and, optionally, of the main group III of the Periodic Table and in the presence of inert solvents. The process is characterized in that in the preparation and purification, saturated hydrocarbons with 6 to 9 carbon atoms and constant boiling points are used as inert solvents. The purification steps are carried out continuously in a dry inert-gas atmosphere, in the presence of aliphatic alcohols with 2 to 3 carbon atoms or their mixtures and the crude polymerizates goes through one or two purification steps. The first purification step consists of a catalyst decomposition and a separation step. The second optional purification step consists of a pulping and a separation step, and then the purified polymerizate is subjected to a continuous drying and, optionally, a simultaneous steam treatment.

The process of the invention has the advantage that the separation of the catalyst residues, the catalyst starting materials and their reaction products as well as of the low-molecular-weight polymers and of the solvents may be carried out continuously. The purified polymerizates have a high degree of purity. This is surprising since no inorganic acids are used in the purification. Furthermore, pure white products are formed. The non-combustible ash content of the polymerizates is generally below 100 p.p.m. and the halogen content, found by alkali treatment (active halogen), has a maximum 15 p.p.m. The main part of the ash, 70% to 90% by weight, consists of silicon dioxide. Compounds of the subgroup elements or the main group III of the Periodic Table can only be found in slight amounts in the ash. In the polymerizate itself, compounds of the subgroup elements, such as titanium, vanadium or iron, can mostly no longer be found (qualitative color tests).

The polyolefins which can be processed by this process, are, for instance, produced by the processes of DPB 1,191,105, of DAS 1,214,407 and of DOS 1,545,177. These prior art patents disclose production of polyethylene, polypropylene, polybutylene, poly-4-methylpentene as well as modified polyethylene where, for instance, up to 10 mol percent of propylene or n-butene-1 may be co-polymerized.

The saturated hydrocarbons with 6 to 9 carbon atoms and a constant boiling point utilizable in the process of the invention are linear, branched or cyclic hydrocarbons, which are commercially available with at least 90% by weight purity. By a constant boiling point, a boiling interval of a maximum 4° C. is to be understood. The boiling points may lie between 65° C. to 130° C., preferably 80° C. to 110° C. Examples of such hydrocarbons are: hexane, cyclohexane, methylcyclohexane, heptane and various methylheptanes, such as isoctane (2-methylheptane), various dimethylhexanes and trimethylpentanes, such as particularly 2,2,4-trimethylpentane, also 1,3-dimethyl and 1,4-dimethylcyclohexane. Also mixtures of the named solvents may be used if the mixture boils in an interval of 4° C.

As aliphatic alcohols or alkanols with 2 to 3 carbon atoms, ethanol, n-propanol, isopropanol or their mixtures are used. If large amounts of catalyst are to be removed, the mixtures, for instance of ethanol and isopropanol in 1:1 ratio, show particularly very good cleaning effects. The alcohols are always used together with the hydrocarbons. These hydrocarbon/alcohol mixtures preferably contain 1% to 40% by volume, preferably 5% to 25% by volume, of alcohol. Particularly suitable are combinations of heptane or 2,2,4-trimethylpentane with ethanol and/or isopropanol. All these hydrocarbon/alcohol mixtures generally do not have constant boiling points.

The selection of the aliphatic alcohols that are used in mixture with the hydrocarbon is of decisive significance for the purification of the polyolefins, prepared with silicon catalysts. It has been found that methanol is unsuitable because of the formation of insoluble substances with the catalysts. With butanol and higher aliphatic alcohols, particularly difficult separation problems arise in regard to the simultaneously used paraffin hydrocarbon, if hydrocarbons are used whose boiling points do not lie substantially above 120° C. But for economic reasons, it is desirable not to use too high boiling solvents since their separation from the polymerizate requires the use of considerably larger amounts of steam. Thus, for instance, a simple moving-bed or flow drying is then in these cases no longer sufficient.

In the first purifying step the catalyst, containing in the polymer suspension, is continuously decomposed, under exclusion of moisture at 50° C. to 100° C., preferably at 75° C. to 85° C., with a mixture of alcohol and hydrocarbon. After a certain duration, the polymerizate is separated from the solvent and after-washed. This continuous procedure is carried out in a heatable vessel with agitator and a connecting separator. Both apparatus are provided with necessary measuring devices and suitable inlets and outlets.

In this decomposition and separation procedure it has been found that medium durations of under one hour, generally 15 to 30 minutes, are sufficient to dissolve out the silicon catalysts used from the polymer product. This is surprising since in a continuous procedure, the absolute duration within the duration spectrum of treatment is under one minute. By the elevated temperature used, it is also guaranteed that a large part of the polymer waxes, containing bound silicon, are extracted from the polymerizate.

When catalysts are employed with much heterogenous portions, it may be appropriate to work during the step of catalyst decomposition in the presence of slight amounts of dry air or dry oxygen. Amounts up to 30 N cm.³/100 gm. of dry polyolefin are sufficient. Mostly it suffices, however, to saturate the mixture of hydrocarbon and alcohol used at room temperature with air or oxygen. This proceddure raises the solubility of the compounds of the elements of the sub-groups IV to VI of the Periodic Table, present in the catalyst, and polymerizates of a high degree of purity are obtained.

The separation of the main amount of the liquid phase occurs in the successively arranged separator at temperatures between 35° C. and 80° C. Preferably continuous or continuously cyclic working decanters or scaling centrifuges are used as the separator. For the after-washing, the hydrocarbon itself, or a mixture of paraffin hydrocarbon and alcohol, may be used. The conditions of after-washing, such as temperature, amount of liquid and its composition are, of course, dependent upon the equipment and upon whether a further purification is anticipated.

The second purification step is not absolutely required. It is necessary only when, within the preceding purification step on the separator, little or no after-washing was done, or when relatively large amounts of catalyst were utilized for the preparation of the polymerizate. In this second step of processing, the moist substance from the separator of the first purification step is pulped or mashed with the hydrocarbon or with a mixture of hydrocarbon and alcohol. The temperatures utilized are between 50° C. and 100° C., preferably 65° C. and 75° C. With the use of hydrocarbon alone, higher temperatures may be appropriate. In the presence of only slight amounts of alcohol in the hydrocarbon, the solubility of low molecular weight polymer portions increases very strongly with the temperature, so that at this point it is possible to influence the molecular weight distribution of the polymerizate recovered in the direction of a narrowing of this distribution.

The separation and washing of the polymerizate is carried out as in the first purification step on a separator. The procedure may, analogous to the first purification step, be varied within the possibilities described. However, it is decisive for the selection of the conditions, what requirements in regard to purity and content of low molecular weight portions are required of the purified polymerizate.

In order to save in the handling of solvents it is advantageous to return the washing mother liquors from the separators back to the decomposition and mashing vessels. There, they supplement the solvents used for the decomposition of the catalyst or for pulping. In the application of the described two purification steps it is particularly advantageous to charge the mother liquor from the separator of the first purification step together with a mixture of hydrocarbon and alcohol into the decomposition vessel.

The two purification steps can be preceded by an optional further purification procedure (pre-purification step). In this pre-purification step, the polymer suspension, obtained in the polymerization, is, before the first purification step at temperatures between 50° C. and 100° C., under exclusion of air and moisture, separated in a separator from at least 50% by volume, preferably 70% to 90% by volume, of the hydrocarbon present and is washed with hydrocarbon at temperatures between 50° C. and 100° C. Fully continuously working decanters are preferred as a separator in this case. It is additionally possible by the change in temperature and of the conditions of the washing in the separator to change the low-molecular-weight or atactic portion of the polymerizate and thus to influence its properties, such as distribution of the molecular weight and thermoplastic behavior.

According to the process of the invention the various purification steps may be combined. Thereby it is possible in a simple way to adapt the purity of the polymerizate and thus also its properties to the desired demands.

However, the crude polymerizate may, only in one purification step, at temperatures between 50° C. and 100° C., be treated in the decomposition vessel with a mixture of hydrocarbon and alcohol. Subsequently, the polymerizate is separated hot in a separator, and after-washed with the paraffin hydrocarbon or with a mixture of the hydrocarbon and alcohol. In this instance, preferably scaling centrifuges are used.

It is further possible that a second purification step follows the first purification step before the drying, where the partially purified polymerizate at temperatures between 50° C. and 100° C., preferably 65° C. to 75° C., is mixed in a pulping mixer with the hydrocarbons or a mixture of the paraffin hydrocarbon and alcohol, separated hot in a separator, and is after-washed hot with the hydrocarbon or the mixture of hydrocarbon and alcohol. Advantageously, in the first purification step, the catalyst is decomposed in the decomposition vessel with a mixture of hydrocarbon and alcohol, then the polymerizate separated in the separator of the first purification step and washed briefly with a mixture of the hydrocarbon and alcohol. Subsequently, the polymerizate is mixed with the hydrocarbon in the pulping vessel, separated in the second separator of the second purification step and again washed with the hydrocarbon.

The described pre-purification step may precede these two possibilities. Then, it is appropriate to separate the largest part of the mother liquor and of the soluble waxes in the separator of the pre-purification step, followed by a short hot after-wash with the hydrocarbon, then to carry out the catalyst decomposition by a mixture of the hydrocarbons and the alcohol in the decomposition vessel, to separate on the scaling centrifuge and to wash intensely with the hydrocarbon.

The continuous drying of the polymerizate is carried out preferably at temperatures between 70° C. and 128° C. The optional steam treatment is often effected with superheated steam in amounts of from 1% to 50% by weight, preferably 10% to 30% by weight, based on the dry polymerizate. The steam is mostly blown in together with nitrogen and the polymer dried in a known manner. By the use of the optional steam treatment, not only is the drying accelerated but also the residual "active" catalyst ingredients, such as metal halides are hydrolyzed and made inactive. This treatment gives, in addition, a noticeable coarsening of the grain of the polymerizate powder whereby the dust portion is reduced. In the last washings in the separators, when steam drying as to be employed, appropriately only hydrocarbon is used. All purification procedures and also the drying are carried out under the protection of inert gas. Nitrogen is mainly used as the inert gas.

With reference to the drawing, depicting the flow diagram of the invention, the polymerizate is charged through the piping 9 into the decomposition vessel 1, and there the catalyst is decomposed by the mixture of hydrocarbon and alcohol, coming from the piping 10. Then in the separator 3 the mixture is separated and washed. Thereafter, the polymerizate is passed into the mashing vessel 2 and is there mixed with solvents. In the connected separator 4 it is again separated and washed. When only one purification step is followed, the second purification step (mashing) may be by-passed over the piping 13. If, additionally, a pre-purification step is to be carried out, the polymer suspension is first brought into the separator 5, and thereafter the polymerizate is passed into the decomposition vessel 1.

The purified polymerizate is lead to the continuous dryer 6, where optionally through the piping 14, superheated steam is introduced. In a cyclone 7 the polymerizate powder is recovered. In the use of steam, a separator 8 is required for the separation of water from hydrocarbon. The pipings designated with 10 are the feeds for the solvents. The used solvents are discharged through the discharge pipes 11 and collected. The number 12 designates the path of the polymerizates from apparatus to apparatus.

In the continuous purification process, according to the invention, only hydrocarbons with 6 to 9 carbon atoms and a constant boiling point (in total amounts of from 4 to 7 l./per kg. of dry polyolefin) and alcohols with 2 to 3 carbon atoms (in total amounts of from 100 to 600 ml./per kg. of dry polyolefin) are used. The mother liquors from the separators as well as the solvent portions from the drying step can be collected together and processed. A simple purification of the solvents is thereby obtained.

The following specific embodiments are illustrative of the practice of the invention. It is to be understood, however, that the same are not limitative.

Example 1

This example shows a continuous purification of polyethylene from a polymer suspension containing a catalyst, by separating of the largest part of the mother liquor and soluble waxes in the separator 5, hot after-washing with the suspension liquid in 5, decomposition of the catalyst by a mixture of 85% by volume of suspension liquid and 15% by volume of ethanol in the decomposition vessel 1, separation and intensive washing with the suspension liquid on the scaling centrifuge 3, and drying in the continuous drier 6.

The production of the polyethylene is carried out continuously in an enameled agitator autoclave at 84.5° C. and 10 atmospheres of ethylene, suspension volume 25 liters, concentration 35.5% by weight. Addition of the suspension liquid, catalyst and ethylene as well as suspension discharge are done continuously. 2,2,4-trimethylpentane, of about 92% purity, is used as suspension liquid. The main impurity in the suspension liquid is 2,2-dimethylhexane, 7%, boiling point of the mixture 98 to 101.5° C.

The reaction product of methylhydrogenpolysiloxane (viscosity 32 cst./25°), aluminum chloride and titanium tetrachloride, which, according to German published application DOS 1,545,177 was prepared in little 2,2,4-trimethylpentane under pure nitrogen, was used as polymerization catalyst or contact substance.

Per hour, 1.46 kg. of polyethylene was continuously, in intervals of about 5 minutes, removed as a suspension in the above-named concentration from the reactor and the pressure released. Because of the small processing installation, the further processing was done continuously on a cyclic basis. About 6 liters of the polymer suspension were collected and each time separated in the separator 5, which is arranged as a filter candle, at 80° C., from 68% of the mother liquor. The polymer cake was after-washed at the same temperature with 0.7 liter of 2,2,4-trimethylpentane, or about 300 ml. per kg. of polyethylene. Then the moist polyethylene was passed into an agitator vessel 1 with stirring and under nitrogen and, at 77° C., brought into contact with 2.5 l./per kg. of polyethylene of a mixture of 2,2,4-trimethylpentane containing 15% by volume of ethanol for a duration of one-half hour. The now pure white polymer suspension was separated from the mother liquor on a scaling centrifuge 3 at 40° C. and after-washed with 1.2 l./per kg. of polyethylene of 2,2,4-trimethylpentane. After drying the polyethylene in a small flow drier 6 under nitrogen at 105° C. and separation through a centrifuge 7, pure white polyethylene powder with the following properties was obtained.

| | |
|---|---|
| Melt index load 5 kp., ASTM 1238/57 T. | 3.8 gm./10 min. |
| Density on a 1-mm. pressed plate, ASTM D 792/50 | 0.9547 gm./cm.$^3$. |
| Ash by burning | 75 p.p.m. |
| TiO$_2$-content of ash | 11%. |
| Titanium-test qualitative test with 30% H$_2$O$_2$ in 10% aqueous H$_2$SO$_4$ and a trace of emulsifier | Colorless. |
| Evaporation test 150°/1½ hr./vac. 12 torr. | Loss 400 p.p.m. |
| Appearance | Pure white. |
| Halogen content Cl$^-$ (alkali treatment) | 12 p.p.m. |
| Heptane extraction, 24 hrs., boiling heptane | 2.8% extract. |
| Notched-bar impact strength DIN 53453 on a 4 mm.-pressed plate | 8.15 (20°) kp. cm./cm.$^2$. 7.3 (0°) kp. cm./cm.$^2$. |

The solvent mixtures obtained from 5, 3 and 7 were collected, purified and recycled back into the polymerization or polyethylene purification process.

An analogous experiment in which with by-passing of the filter candle, the polymerizate suspension from the polymerization reactor was passed directly into the agitator vessel after the pressure was released. A 1-liter mixture per kg. polyethylene was used for the catalyst decomposition. A polyethylene with the following properties was obtained.

| | |
|---|---|
| Melt index 5 kp. | 4.35 gm./10 min. |
| Density | 0.9553 gm./cm.$^3$. |
| Ash | 95 p.p.m. |
| TiO$_2$-content of the ash | 20% by weight. |
| Titanium test | Colorless. |
| Evaporation test | 430 p.p.m. |
| Appearance | Pure white. |
| Halogen content Cl$^-$ | 14 p.p.m. |
| Heptane extraction | 4.4% by weight. |
| Notched-bar impact strength on a 4-mm pressed plate | 6.6 (20°) kp. cm./cm.$^2$. 6.1 (0°) kp. cm/cm.$^2$. |

It can be clearly seen that the polyethylene, separated in 5 from the crude mother liquor and washed hot, has a smaller portion of lower molecular polymer chains and a correspondingly higher notched-bar impact strength.

In an analogous experiment in a larger polymerization reactor (650 liter suspension, 35 kg. of polyethylene/h.) a continuous decanter was used as separator 5. In an otherwise same polyethylene processing, a product is obtained which has an ash content of only 55 p.p.m. with 12% by weight TiO$^2$. The active halogen content Cl$^-$ of the polyethylene is reduced to 8 p.p.m.

Example 2

This example shows a continuous processing of a polyethylene suspension containing a catalyst by treatment with a mixture of 83% by vol. of 2,2,4-trimethylpentane and 17% by vol. of a 1 to 1 by volume mixture of ethanol and is propanol in the decomposition vessel 1 and intensive washing with 2,2,4-trimethylpentane on the scaling centrifuge 3, and drying in the continuously working drier 6.

The continuous ethylene polymerization was carried out, as described in Example 1, but as 80° C. and at a continuous concentration of 46% by weight of polyethylene in the described mixture of 2,2,4-trimethylpentane and 2,2-dimethylhexane. The catalyst of methylhydrogenpolysiloxane, titanium tetrachloride and aluminum chloride was prepared so that only 16.5% of the titanium tetrachloride were reduced to trivalent titanium compounds. 1.76 kg. of polyethylene as a suspension in 2,2,4-trimethylpentane per hour were brought to the purification steps. The purification was carried out only in a 10 liter decomposition vessel 1, the scaling centrifuge 3 and by afterwashing on the latter. The catalyst decomposition in the decomposition vessel 1 was carried out at 80° C with an average duration of 20 minutes by the addition of a 1.2 l./per kg. of polyethylene of the mixture of 2,2,4-trimethylpentane and alcohol. After separating in centrifuge 3 at 45° C., the polyethylene was after-washed at 65° C. with 1.7 l./per kg. of polyethylene of the mixture. However, this washing mixture contained only 8% by volume of the alcohol mixture. After the flow drying in 6 with 120° inlet temperature and cyclone separation of the polyethylene in 7, a pure white powdery polyethylene with a final moisture 0.1% and the following further properties was obtained.

| | |
|---|---|
| Malt index 5 kp. | 2.1 gm./10 min. |
| Density | 0.9560 gm./cm.$^3$. |
| Ash | 40 p.p.m. |
| Titanium test | Colorless. |
| Evaporation test | 650 p.p.m. loss. |
| Appearance | Pure white. |
| Heptane extraction | 3.4% by weight. |
| Stabilizer test | 4. |

The stabilizer test was conducted in a ball mill. 100 gm. of dry polyethylene powder were admixed with 0.1 gm. of "Santonox R", 0.5 gm. of "Cyasorb UV 531" and 0.25 gm. of calcium stearate during 30 minutes. A 1-mm. thick pressed plate, prepared from the mixture at 175°/6′/200 atms. was evaluated by its color tone. The color scale 1 to 10 extends from pure white to slightly yellow, through yellow-brown 6 to 7 to ocher-brown 10. For comparison: Polyethylene prepared by the Ziegler process (titanium tetrachloride+aluminum alkyl), shows generally color tones between 5 and 7; polyethylene prepared by the Phillips process (chromium oxide on carrier) generally shows a color tone of 4.

The polymerization and purification of the polyethylene was run continuously for about 10 days. The obtained solvents (mother liquor, washing mother liquor and from the drying) were collected and worked up together.

An analogous experiment where mixtures of heptane and isopropyl alcohol were used, after the described processing, an almost equally pure polyethylene with an ash of 60 p.p.m. and a stabilizer test of 4 to 5 was obtained.

In another analogous experiment, where a mixture of ethylene and butene-1 (8 mol percent) was charged for the polymerization, each hour 1.55 kg. of modified polyethylene was purified. For the catalyst decomposition, a decomposition mixture of 2,2,4-trimethylpentane with 11% by volume of alcohol mixture (volume ratio 1:1) was used. The washing mixture in this experiment on the centrifuge 3 contained only 1% of the alcohol mixture and the washing temperature was 72° C. A powdery modified polyethylene with the following properties was obtained.

| | |
|---|---|
| Melt index 5 kp. | 3.3 gm./10 min. |
| Density | 0.9480 gm./cm.$^3$. |
| Ash | 70 p.p.m. |
| Titanium test | Almost colorless. |
| Heptane extraction | 4.1% by weight. |
| Stabilizer test | 4 to 5. |

The addition of butene-1 to the ethylene polymerization causes an increase in the lower molecular weight portions of the polymer. This example demonstrates an intensive removal of low molecular polymer portions from the modified polyethylene by an increase of the 2,2,4-trimethylpentane content in the decomposition vessel 1 and centrifuge 3 and by increase of the washing temperature.

Example 3

This example shows a continuous purification of polyethylene which was prepared with a catalyst of methylhydrogenpolysiloxane, an equimolar mixture of aluminum chloride and aluminum isopropylate and of titanium tetrachloride in little 2,2,4-trimethylpentane (99%) under purified nitrogen, by treating of the polymer suspension with a mixture of 80% by volume of 2,2,4-trimethylpentane and 20% by volume of isopropyl alcohol in the decomposition vessel 1, separation and washing with 2,2,4-trimethylpentane on a decanter 3, pulping with a mixture of 2,2,4-trimethylpentane and isopropanol in mixer 2, separation and washing with 2,2,4-trimethylpentane on a second decanter 4 and drying of the polyethylene in continuous drier 6.

The continuous polymerization of the ethylene was carried out over a period of 30 days at 10 atms. and 75° C. Each hour, 36 kg. polyethylene as a suspension in 90 liters of 2,2,4-trimethylpentane were recovered for purification. The purification was conducted in a first purification step in decomposer 1 at 76° C. and an average duration of 30 minutes with the addition of 0.85 l./per kg. of polyethylene of a mixture (2,2,4-trimethylpentane with 20% by volume isopropyl alcohol), separation and washing in decanter 3 with 0.3 l./per kg. of polyethylene of 2,2,4-trimethylpentane. The subsequent second purification step served for the complete removal of the catalyst, already decomposed in the first purification. The moist polyethylene cake, obtained from decanter 3, was pulped at 70° C. in the mashing container 2 with a mixture of 95% by volume of 2,2,4-trimethylpentane and 5% by volume of isopropanol to a concentration of about 40% by weight and passed through the decanter 4 and separated from the mother liquor. It was then afterwashed in decanter 4 with 0.3 l./per kg. of polyethylene of 2,2,4-trimethylpentane. The after-washings on the decanters 3 and 4 are done at 65° to 70° C.

Further purification by drying was conducted as in the already described examples.

A polyethylene with the following properties was obtained.

| | |
|---|---|
| Melt index 5 kp. | 3.5 gm./10 min. |
| Solution viscosity | 2,3 dl./gm. |
| Ash | 70 p.p.m. |
| TiO$_2$-content of ash | 14% by weight. |
| Titanium test | Colorless. |
| Heptane extraction | 3.9% by weight. |
| Stabilizer test | 4 to 5. |

The solution viscosity was determined as reduced specific viscosity $r_{red}$ in Decalin at 135° C. at a concentration of 0.1 gm. in 100 ml.

An analogous continuous purification of polyethylene was effected in that the second purification step in mashing vessel 2, the pulping was carried out only with 2,2,4-trimethylpentane and kept for 30 minutes (average duration) at 78° C. The after-washing on the decanters 3 and 4 was also conducted at higher temperatures of about 75° C.

The properties of the dried polyethylene powder demonstrate that by the change in the processing conditions, more low molecular polymer portions could be removed.

| | |
|---|---|
| Melt index 5 kp. | 2.9 gm./10 min. |
| Solution viscosity | 2.3 dl./gm. |
| Ash | 55 p.p.m. |
| Heptane extraction | 2.4% by weight. |
| Stabilizer test | 4 to 5. |

Example 4

This example shows a continuous purification of polypropylene which is polymerized according to DAS 1,214,-407 with a catalyst of triethylsilane, phenylmethylsilane, aluminum chloride and titanium tetrachloride. Heptane is used ts the suspension liquid. The purification was conducted according to the purification combination described in Example 1: separating in 5, catalyst decomposition in 1, separating and intensive washing in 3.

1.1 kg. of polypropylene as a suspension in heptane were continuously purified per hours. The separation of the mother liquor and of the largest part of the atactic polymer portion was carried out at 85° C. in separator 5. The after-washing of the polymer in 5 was with 400 ml./per kg. of polypropylene of heptane. In the decomposer 1, the moist polymer cake was brought in contact with 2.7 l./per kg. of polypropylene of mixture at 80° C. under stirring with an average duration of 30 minutes. The mixture was composed of 88% heptane and 12% of a mixture of almost equal volumes of ethanol and isopropanol and was saturated with dry air. During the catalyst decomposition, 0.2 N liters of air per kg. of polypropylene were also passed through the suspension. For the further processing, a separation was carried out on a scaling centrifuge 3 at 75° C. with an after-washing at the same temperature with 1.3 l./per kg. of polypropylene of heptane. After drying, a pure white powder of polypropylene with the following properties was obtained.

| | |
|---|---|
| Melt index 5 kp., 230° | 3.4 gm./10 min. |
| Melting range (polarization microscope) | 156° to 160° C. |
| Density | 0.9063 gm./cm.$^3$. |
| Ash | 95 p.p.m. |
| $TiO_2$-content of the ash | 28.5% by weight. |
| Titanium test | Weakly yellow. |
| Heptane extraction | 13.4% by weight. |

Example 5

This example shows the drying of moist polyethylene as it is obtained according to Example 1 with the aid of a mixture of nitrogen and steam.

200 grams of moist polyethylene with about 8% residual moisture which consists of 2,2,4-trimethylpentane with 3% by volume of ethanol, from the separator 3 of the continuous polyethylene processing, were continuously metered into a drier 6. The latter consists of a combination of two heatable cylinders, succesively connected. From the dryer 6, the exhaust was passed into a powder separator 7 and a water separator 8. Nitrogen flows, after measuring its volume, through two successively connected pre-heaters (165° C.). Simultaneously the appropriate amount of water was metered through a hose pump into the first gas heater. The amount of water formed superheated steam at about 4% by volume of the nitrogen, that is, about 22% by weight of water based on dry polyethylene. In entering the drier the gas mixture had a temperature of 136° C. The temperature in the drying cylinders was kept constant at 127° C., the temperature of the powder separator at 102° to 104° C. The nitrogen, after condensing out the 2,2,4-trimethylpentane/water mixture in 8, was recycled.

The polyethylene powder obtained at 12 had a residual moisture of under 0.1% and, in comparison to a product dried only under nitrogen, had the following properties:

| | Dried only with $N^2$ | Dried with steam with $N^2$ |
|---|---|---|
| Bulk density, ASTM D 1895/61 T, gm./l. | 415 | 445 |
| Specific surface according to BET, m².//gm. | 0.54 | 0.33 |
| Halogen content Cl-, p.p.m. | 13 | 6.5 |
| Stabilizer test | 4–5 | 3–4 |
| Grain size in μ | 50–125(95%) | 100–200(91.5%) |

The advantageous influence of the admixture of steam to the inert carrier gas nitrogen during the polyethylene drying can clearly be seen.

The preceding specific embodiments are illustrative of the practice of the invention. It is to be understood, however, that other experients known to those skilled in the art or disclosed herein may be employed without departing from the spirit of the invention or the scope of the appended claims.

We claim:
1. A process for the purification of polyolefins polymerized in the presence of a catalyst system of silicon compounds formed from the reaction of siliconhydrogen compounds, metal compounds of subgroups IV to VI of the Periodic Table and, optionally, of the main group III of the Periodic Table, and in the presence of inert organic solvents which consists in the steps of (1) utilizing, as said inert organic solvent and as the purification solvent, a solution of saturated hydrocarbons having 6 to 9 carbon atoms and a constant boiling point, (2) decomposing a polyolefin suspension in said solvent containing said catalyst system by the action of said solvent containing from 1% to 40% by volume of an alkanol having 2 to 3 carbon atoms and mixtures thereof, under a dry gas atmosphere at a temperature of from 50° C. to 100° C. under anhydrous conditions, (3) separating moist polyolefin from said solvent, (4) washing said moist polyolefin with said solvent containing from 0 to 40% by volume of an alkanol having 2 to 3 carbon atoms and mixtures thereof at a temperature of from 50° C. to 100° C., (5) continuously drying said washed moist polyolefin, and (6) recovering purified polyolefins substantially free of ash and low molecular weight polymers.

2. The process of claim 1 wherein said washed moist polyolefin obtained at step 4 is additionally purified by the steps consisting of (1) pulping in said solvent containing from 0 to 40% by volume of an alkanol having 2 to 3 carbon atoms and mixtures thereof under a dry gas atmosphere at a temperature of from 50° C. to 100° C. under anhydrous conditions, (2) separating moist polyolefin from said solvent, (3) washing said moist polyolefin with said solvent containing from 0 to 40% by volume of an alkanol having 2 to 3 carbon atoms and mixtures thereof at a temperature of from 50° C. to 100° C., and thereafter passing said washed moist polyolefin to step 5.

3. The process of claim 1 wherein said dry gas atmosphere contains nitrogen and oxygen.

4. The process of claim 2 wherein said dry gas atmosphere contains nitrogen and oxygen.

5. The process of claim 1 wherein said polyolefin suspension in said solvent containing said catalyst system is first, before said decomposition step 2, subjected to a separating step wherein at least 50% by volume of said solvent is separated from said polyolefin at a temperature of from 50° C. to 100° C., said separated polyolefin is washed with said solvent at a temperature of from 50° C. to 100° C., and thereafter said pre-washed polyolefin suspension is passed to said decomposing step 2.

6. The process of claim 1 wherein said mother liquor solvent from said washing step 4 is recycled to said decomposing step 2 as said solvent.

7. The process of claim 1 wherein said continuously drying step 5 is conducted in the presence of from 1% to 50% by weight, based on the polyolefin, of superheated steam.

8. The process of claim 7 wherein from 10% to 30% by weight, based on the polyolefin, or superheated steam is employed.

9. The process of claim 1, step 2, wherein said solvent contains from 5% to 25% by volume of said alkanol.

10. The process of claim 1, wherein said alkanol is a mixture of ethanol and isopropanol.

References Cited

UNITED STATES PATENTS

| 3,202,617 | 8/1965 | Enk et al. | 260—94.9 C |
| 3,058,971 | 10/1962 | Miller et al. | 260—94.9 F |

FOREIGN PATENTS

| 906,425 | 9/1962 | Great Britain | 260—94.9 C |
| 1,214,407 | 4/1966 | Germany | 260—94.9 C |

JOSEPH L. SCHOFER, Primary Examiner

A. HOLLER, Assistant Examiner

U.S. Cl. X.R.

260—93.7, 94.9 F